3,341,571
METHYL-N-PROPYL TETRAHALO-
TEREPHTHALATES
Sidney B. Richter, Chicago, and Alfred A. Levin, Skokie, Ill., assignors to Velsicol Chemical Corporation, Chicago, Ill., a corporation of Illinois
No Drawing. Filed Feb. 23, 1965, Ser. No. 434,654
4 Claims. (Cl. 260—475)

This invention relates to the production of new herbicidal compositions of matter. More specifically, this invention relates to new chemical compounds of the formula

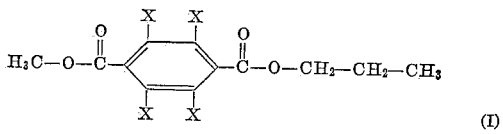

(I)

wherein X is halogen. While the halogen can be fluorine, chlorine, bromine, or iodine, the preferred halogen is chlorine or bromine, since the required starting materials are more readily available. A most preferred halogen is chlorine. These new compounds have been found to be useful as herbicides, particularly as herbicides for grassy weeds.

The compounds of the present invention are termed methyl n-propyl 2,3,5,6-tetrahaloterephthalates. Exemplary of the specific compounds of the present invention are: methyl n-propyl 2,3,5,6-tetrachloroterephthalate, methyl n-propyl 2,3,5,6-tetrabromoterephthalate, methyl n-propyl 2,3,5,6-tetrafluoroterephthalate, and the like.

The manner in which the compounds of this invention can be prepared is illustrated in the following examples:

EXAMPLE 1

Preparation of 4-carbomethoxy-2,3,5,6-tetrachlorobenzoic acid

Dimethyl 2,3,5,6-tetrachloroterephthalate (65 g.; 0.2 mol), which can be prepared as described by Rabjohn, J.A.C.S., 70, 3518 (1948), dissolved in dioxane (400 ml.) is placed into a 1 liter, three-necked flask equipped with a mechanical stirrer, reflux condenser and heating mantle. Potassium hydroxide (10.9 g.; 0.2 mol) in 130 ml. of 3:2 dioxane-methanol solution was added to the flask. The mixture was heated at reflux with stirring for six hours and then poured into one liter of cold water to precipitate unreacted dimethyl 2,3,5,6-tetrachloroterephthalate, which upon extraction from the aqueous solution with diethyl ether and stripping of the ether yielded 33.8 g. (0.1 mol) of unreacted dimethyl 2,3,5,6-tetrachloroterephthalate. The aqueous solution was acidified with hydrochloric acid yielding an oil, which was dissolved in diethyl ether. The ethereal solution was separated from the aqueous mixture, washed with cold water, dried over magnesium sulfate, filtered free of drying agent, and stripped of diethyl ether by heating in vacuo to yield an oil, which upon trituration with pentane yielded a yellow solid. The solid was recrystallized from pentane to yield the half-ester acid melting 167–9° C., in an 82.7% yield based on recovered starting material. The half-ester acid had the following elemental analysis:

Calculated for $C_9H_4Cl_4O_4$: Theoretical: C, 34.00%; H, 1.27%. Found: C, 34.65%; H, 1.29%.

Infrared spectra of the half-ester acid indicated no dimethyl terephthalate was present in the product.

EXAMPLE 2

Preparation of 4-carbomethoxy-2,3,5,6-tetrachlorobenzoyl chloride

A mixture of the half-ester acid (8.5 g.; 0.027 mol) prepared in Example 1, and thionyl chloride (50 ml.) was heated at reflux for 16 hours. The mixture was then cooled and excess thionyl chloride removed by heating under reduced pressure to yield an oil which solidified on standing. The solid was triturated with a small amount of pentane to yield crude acyl chloride melting at 82–4° C. in a 74.4% yield. The crude material had the following elemental analysis:

Calculated for $C_9H_3O_3Cl_5$: Theoretical: C, 32.13%; H, 0.9%. Found: C, 33.13%; H, 1.28%.

Infrared spectra of the crude material indicated no half-ester acid was present.

EXAMPLE 3

Preparation of methyl n-propyl 2,3,5,6-tetrachloroterephthalate

A mixture of the product of Example 2 (10.8 g.; 0.03 mol) and n-propanol (75 ml.) was heated at reflux for 16 hours. Excess n-propanol was removed by warming on a steam bath under reduced pressure. The oily residue was distilled to collect methyl n-propyl 2,3,5,6-tetrachloroterephthalate as the fraction boiling at 144° C. at 0.2 mm. mercury pressure and having a refractive index at 27° C. of 1.5363 and the following elemental analysis:

Calculated for: $C_{12}H_{10}Cl_4O_4$: Theoretical: C, 40.03%; H, 2.80%. Found: C, 40.60%; H, 3.10%.

The other compounds of the present invention can be prepared readily in the manner of the previous examples by utilizing the appropriate starting materials. Given in Examples 4 and 5 are the reactants required to form the named compound of the present invention.

EXAMPLE 4

Dimethyl 2,3,5,6 - tetrabromoterephthalate+potassium hydroxide+thionyl chloride+n-propanol=methyl n-propyl 2,3,5,6-tetrabromoterephthalate.

EXAMPLE 5

Dimethyl 2,3,5,6 - tetrafluoroterephthalate+potassium hydroxide+thionyl chloride+n-propanol=methyl n-propyl 2,3,5,6-tetrafluoroterephthalate.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of the particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water-in-oil) can be prepared for direct application to weed infestations.

A typical herbicidal composition according to this invention is illustrated by the following example, in which the quantities are in parts by weight.

EXAMPLE 6

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers; spreaders; deactivators; adhesives, stickers, fertilizers, activators, synergists, and the like.

The compounds of the present invention are also useful when combined with other herbicides and/or defoliants, dessicants, growth inhibitors, and the like, in the herbicidal compositions heretofore described. These other materials can comprise from about 5% to about 95% of the active ingredients in the herbicidal compositions. Use of combinations of these other herbicides and/or defoliants, dessicants, etc., with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), and the like; carbamate herbicides such as IPC, CIPC, swep, barban, and the like; thiocarbamate and dithiocarbamate herbicides such as CDEC, metham sodium, EPTC, diallate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethylacetamide, CDEA, alpha-chloro-N-isopropylacetamide, 4 - (chloroacetyl)morpholine, 1-(chloroacetyl)piperidine, and the like; chlorinated aliphatic acid herbicides such as TCA, dalapon, 2,3-dichloropropionic acid, and the like, chlorinated benzoic acid and phenylacetic acid herbicides such as 2,3,6-TBA, 2,3,5,6-TBA, dicamba, tricamba, amiben, fenac, 2-methoxy-3,6-dichlorophenylacetic acid, 3-methoxy-2,6-dithoxy-3,6-dichlorophenylacetic acid, 2-methoxy-3,5,6-trichlorophenylacetic acid, and the like; and such compounds as aminotriazole, maleic hydrazide, phenyl mercuric acetate, endothal, biuret, technical chlordane, diquat, erbon, DNC, DNBP, dichlobenil; DPA, diphenamid, dipropalin, trifluralin, solan, dicryl, merphos, DMPA and the like. Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, hounds-tongue, moth mullein, and purple star thistle; or perennials such as white cockle, perennial ryegrass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing. In one pre-emergence test, emulsifiable concentrates or solutions prepared as heretofore described can be extended with water or oil or other suitable extenders, to obtain various concentrations of the active compound. These concentrates are sprayed on the surface of soil which had been seeded less than twenty-four hours earlier with weed seeds. After spraying the soil containers are maintained under normal lighting conditions and supplied with heat as required and daily or more frequent watering. The weeds are observed for about 7 to about 20 days, and the degree of injury to the weeds is recorded. The results indicate that compounds of this invention possess a high order of herbicidal activity.

To demonstrate the post-emergence activity of the compounds of this invention, emulsifiable concentrates or solutions of various concentrations of the aforementioned active compounds are sprayed on the foliage of weeds that have attained a prescribed size. After spraying, the weeds are maintained under normal lighting conditions and supplied with heat as required. The soil in which the weeds are growing is watered daily or more frequently. The weeds are observed periodically for up to 14 days or more, and the severity of injury to the weeds is recorded. The results indicate that the compounds of this invention possess a high order of herbicidal activity.

We claim:
1. A compound of the formula

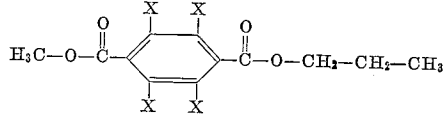

wherein X is halogen.
2. Methyl n-propyl 2,3,5,6-tetrachloroterephthalate.
3. Methyl n-propyl 2,3,5,6-tetrabromoterephthalate.
4. Methyl n-propyl 2,3,5,6-tetrafluoroterephthalate.

References Cited

UNITED STATES PATENTS

| | | | |
|---|---|---|---|
| 2,396,513 | 3/1946 | Jones | 71—2.6 |
| 2,557,639 | 6/1951 | Derr et al. | 260—475 |
| 2,782,225 | 2/1957 | Jones | 260—475 |
| 2,893,855 | 7/1959 | Smith | 71—2.6 |

FOREIGN PATENTS 1,265,053  8/1960  France.

LORRAINE A. WEINBERGER, *Primary Examiner.*

JAMES THOMAS, Jr., *Examiner.*

A. J. ADAMCIK, T. L. GALLOWAY,
*Assistant Examiners.*